United States Patent [19]

Uranishi et al.

[11] Patent Number: 4,790,283

[45] Date of Patent: Dec. 13, 1988

[54] FUEL TANK

[75] Inventors: Koji Uranishi, Susono; Takaaki Ito, Mishima, both of Japan

[73] Assignee: Toyota Jidosha Kabushiki Kaisha, Aichi, Japan

[21] Appl. No.: 831,623

[22] Filed: Feb. 21, 1986

[30] Foreign Application Priority Data

Feb. 25, 1985 [JP] Japan .............................. 60-24691[U]

[51] Int. Cl.⁴ ................................................ F02M 39/00
[52] U.S. Cl. ..................................... 123/519; 123/520; 123/516
[58] Field of Search ............... 123/516, 518, 519, 520, 123/521; 55/387

[56] References Cited

U.S. PATENT DOCUMENTS

| 3,542,239 | 11/1970 | Latuala | 123/519 |
| 3,884,204 | 5/1979 | Krautwurst | 123/519 |
| 3,907,153 | 9/1975 | Mutty | |
| 4,000,727 | 1/1977 | Walker | 123/519 |
| 4,308,840 | 1/1982 | Hiramatsa | 123/519 |
| 4,462,158 | 7/1984 | Wehle | 123/516 |

FOREIGN PATENT DOCUMENTS

| 59-10377 | 4/1984 | Japan . | |
| 59-173749 | 11/1984 | Japan . | |
| 1316161 | 5/1973 | United Kingdom | 123/519 |

Primary Examiner—Carl S. Miller
Attorney, Agent, or Firm—Finnegan, Henderson Farabow, Garrett & Dunner

[57] ABSTRACT

A fuel tank including a tank body, a fuel supply pipe mounted on the tank body, a first canister connected to the tank body through a first fuel vapor passage provided with a change-over control valve therein, and a second canister connected to the tank body through a second fuel vapor passage provided with a check valve therein. The change-over control valve is opened during supply of fuel through the fuel supply pipe and the check valve is opened when the pressure within the tank body exceeds a predetermined value. A first vapor leading opening of the first fuel vapor passage for the first canister is positioned lower than a second vapor leading opening of the second fuel vapor passage for the second canister.

7 Claims, 4 Drawing Sheets

FUEL TANK

BACKGROUND OF THE INVENTION (1) Field of the Invention

The present invention relates to a fuel tank mainly used for automobiles, and more particularly to the construction of the kind of fuel tank for preventing fuel from escaping to the outside air during refueling.

(2) Description of the Related Art

When refueling a vehicle driven by an internal combustion engine, such as a gasoline engine, one uncaps the fuel inlet of the fuel tank and inserts a fuel feed nozzle. However, when the fuel in the tank is low, there is a large quantity of pressurized fuel vapor in the space above the liquid surface of the fuel. When the cap is removed, the fuel vapor in the tank escapes to pollute the outside air. Also, while the liquid fuel is filled into the fuel tank, it strikes the fuel within the tank, creating bubbles which again escape to pollute the outside air.

To prevent the fuel in the fuel tank from escaping to pollute the outside air, there has been provided a recovery apparatus for fuel vapor in which the tank body is connected to the first and second canisters absorbing the fuel vapor. A change-over valve is provided adjacent to the fuel inlet of the tank body. The change-over valve communicates one of the inlets of the first and second canisters with the fuel inlet through insertion of a fuel feed nozzle. The fuel inlet is normally communicated with the first canister. The change-over valve operates and communicates the fuel inlet with the second canister when the fuel feed nozzle is inserted into the tank body (refer to Japanese Examined Utility Model Publication No. 59-10377).

In the above recovery apparatus for fuel vapor comprising the first and second canister, when the fuel volume in the tank body expands due to a temperature rise of the tank body, since both fuel vapor leading openings communicated with the first and second canister are positioned at the same level, the fuel flows as a liquid into the first canister, thus remarkably decreasing the absorbing capacity of the first canister.

SUMMARY OF THE INVENTION

The present invention is intended to solve the above problems.

The object of the present invention is to provide a fuel tank able to prevent the liquid fuel from flowing into a canister even when the fuel in the tank expands in volume and thus to prevent reduction of the absorbing capacity of the canister.

Additional objects and advantages of the present invention will be set forth in the description that follows and in part will be obvious from the description or may be learned by practice of the invention. The objects and advantages of the invention may be realized and obtained by the apparatus particularly pointed out in the appended claims.

According to the present invention, there is provided a fuel tank including: a tank body; a fuel supply pipe mounted on the tank body; a first canister communicating with a first vapor outlet of the tank body through a first fuel vapor passage, the first fuel vapor passage being provided therein with a change-over control valve opened during supply of fuel through the fuel supply pipe; and a second canister communicating with a second fuel vapor outlet of the tank body through a second fuel vapor passage provided with a check valve therein, the check valve being opened when the pressure within the tank body exceeds a predetermined value; a first vapor leading opening of the first fuel vapor outlet being positioned lower than a second vapor leading opening of the second fuel vapor outlet.

According to preferred embodiments, the predetermined opening pressure of the check valve is set to the pressure when the fuel in the tank body rises to the height of the fuel inlet of the fuel supply pipe. The tank body is further provided with a pressure adjusting pipe communicating the fuel supply pipe with the tank body, a fuel vapor leading opening of the pressure adjusting pipe being positioned at the same level as or slightly lower than the first fuel vapor leading opening of the first vapor outlet. The fuel supply pipe is provided with a nozzle guide for insertion of a fuel feed nozzle, the nozzle guide being provided at the end thereof with a closing valve which is opened only when the fuel feed nozzle is inserted into the nozzle guide, the closing valve being interlocked with the change-over control valve so that the change-over control valve is opened and communicates the tank body with the first canister along with the opening of the closing valve.

The accompanying drawings which are incorporated in and constitute a part of this specification, illustrate presently preferred embodiments of the invention and, together with the description, serve to explain the principles of the invention.

DESCRIPTION OF THE PREFERRED EMBODIMENTS

Figure 1:
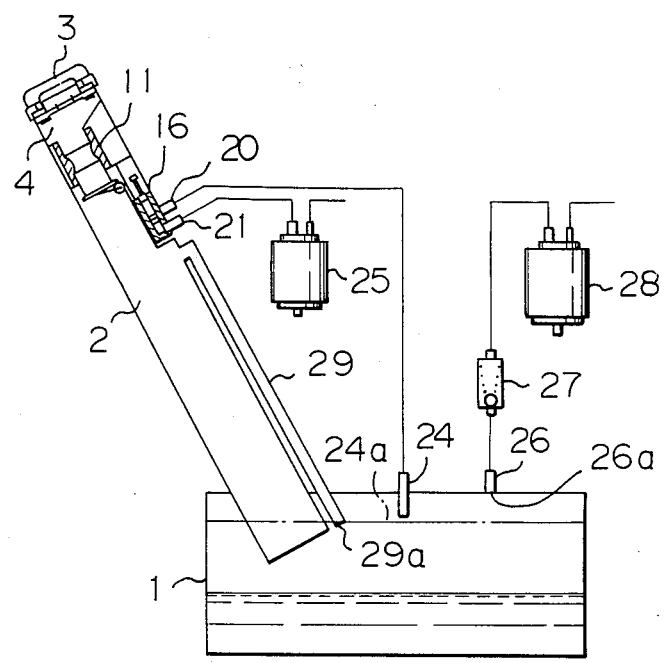
FIG. 1 is a general view of a first embodiment of the present invention.
Figure 2:
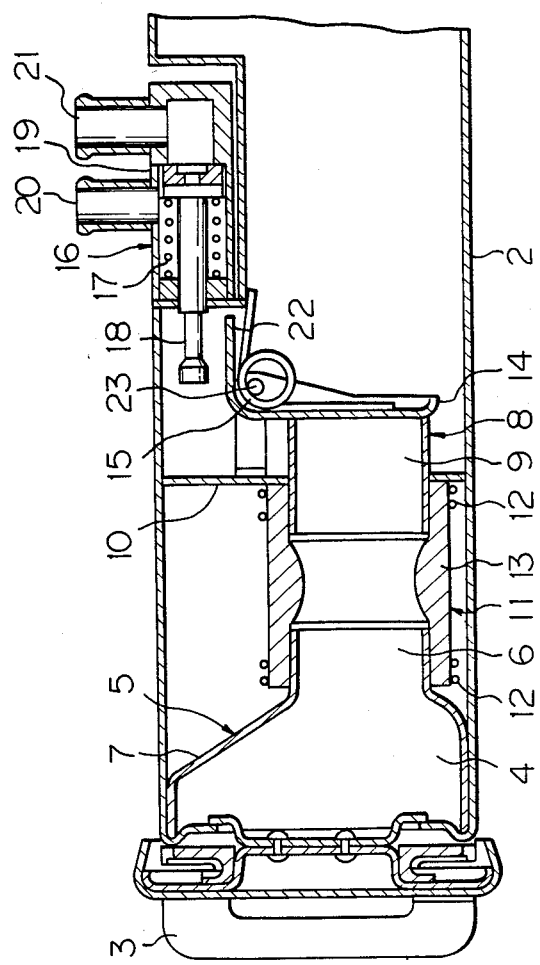
FIG. 2 is an enlarged sectional view of the principal part of the above embodiment.
Figure 3:
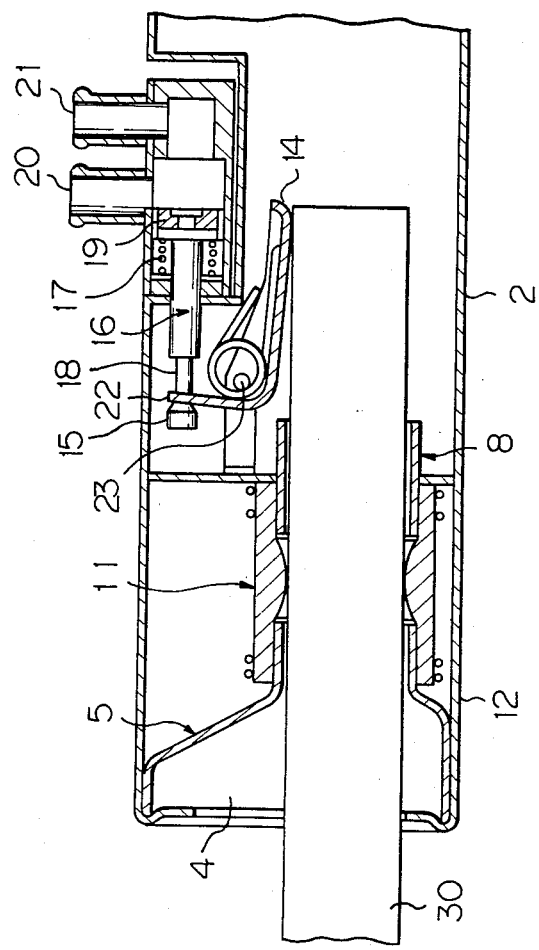
FIG. 3 is a sectional view similar to FIG. 2 but with a fuel feed nozzle inserted into a fuel supply pipe.

Preferred embodiments of the present invention will be described with reference to the accompanying drawings. FIGS. 1 to 3 show a first embodiment of the present invention. A fuel supply pipe 2 is mounted on a fuel tank body 1 and extends obliquely upward. A cap 3 is removably attached to a fuel inlet 4 formed at the upper end of the fuel supply pipe 2.

Referring to FIG. 2, the detailed construction of the portion adjacent to the fuel inlet 4 will be described.

An upper nozzle guide 5 is attached to the fuel inlet 4. The upper nozzle guide 5 comprises, at the lower portion, a cylindrical nozzle insertion passage 6 at one side and having a decreased diameter. An upper portion 7 of the passage 6 presents a horn-shaped configuration. The upper nozzle guide 5 is fixed to the inner wall of the fuel supply pipe 2 by the horn-shaped portion 7. A lower nozzle guide 8 is spaced under the nozzle insertion passage 6. The lower nozzle guide 8 comprises a cylindrical nozzle insertion passage 9 of the same diameter as that of the upper nozzle insertion passage 6 and is fixed to the inner wall of the fuel supply pipe 2 by a flange portion 10. A cylindrical seal pipe 11 is disposed between the upper and lower nozzle insertion passages 6 and 9. The seal pipe 11 is made of a resilient material such as rubber, is closely fitted on the nozzle insertion passages 6 and 9 at the upper and lower ends thereof, and is fastened to the nozzle insertion passages 6 and 9 by clamps 12. The seal pipe 11 is provided, at an intermediate portion thereof remote from the nozzle insertion passages 6 and 9, with an inwardly projecting wall thickness portion 13. The inner diameter of the wall thickness portion 13 is slightly smaller than the outer diameter of a fuel feed nozzle.

A closing valve 14 is attached to the lower end of the nozzle guide 8, which is pushed down and opened by the end of the fuel feed nozzle inserted into the lower nozzle guide 8. The closing valve 14 normally closes the nozzle insertion passage 9 by a spring 15 when the cap 3 is fitted on the fuel inlet 4.

A change-over control valve 16 is arranged adjacent to the closing valve 14, which is controlled to change its opening and closing along with the opening and closing of the closing valve 14. The change-over control valve 16 normally pushes down a valve rod 18 by a spring 17 and prevents communication of a passage 20 to the tank body 1 with passage 21 to a canister by a valve seal 19. Also, the closing valve 14 is provided with an arm 22 engaging the valve rod 18 when the closing valve 14 is rotated about its pivot 23.

Referring to FIG. 1 again, the tank body 1 is provided with a first fuel vapor outlet 24 at the upper wall thereof. The outlet 24 is connected to a first canister 25 containing a fuel absorbent such as activated carbon through a first fuel vapor passage including the passages 20 and 21. The first canister 25 exclusively serves to absorb the fuel vapor when the fuel is ejected into the tank body 1.

The tank body 1 is further provided with a second fuel vapor outlet 26 at the upper wall thereof, which is connected to a second canister 28 similar to the first canister 25 through a second fuel vapor passage including a check valve 27. The second canister 28 normally serves to absorb the fuel vapor in the tank body 1.

The opening pressure of the check valve 27 is set to a pressure of about 250 to 350 mm $H_2O$. By this when the tank body 1 is being filled, fuel is prevented from blowing through the check valve 27 until it rises up to the height of the fuel inlet 4 of the fuel supply pipe 2 from the fuel liquid level in the tank body 1. Thus, fuel vapor is prevented from flowing through the check valve 27 during the supply of fuel.

Also, a first vapor leading opening 24a at the lower end of the first fuel vapor outlet 24 is positioned at a height lower than a second vapor leading opening 26a of the second fuel vapor outlet 26.

The fuel supply pipe 2 is further provided with a pressure adjusting pipe 29 which branches away from the fuel supply pipe, e.g., below the change-over control valve 16, extends down parallel to the fuel supply pipe 2, and opens to the tank body 1. A vapor leading opening 29a at the lower end of the pressure adjusting pipe 29 is positioned at the same level as or slightly lower than the first vapor leading opening 24a.

FIG. 1 shows the fuel tank in normal condition where the vehicle is running or stopped. The fuel vapor arising from the tank body 1 is absorbed in the second canister 28 through the second fuel vapor outlet 26 and the check valve 27. In the meanwhile, the fuel vapor is not absorbed in the first canister 25 since the change-over control valve 16 is closed.

FIG. 3 shows the state in which a fuel feed nozzle has been inserted into the above fuel supply pipe 2. The cap 3 is removed from the fuel inlet 4 and then a fuel feed nozzle 30 is inserted into the nozzle insertion passages 6 and 9. The seal pipe 11 abuts the outer surface of the fuel feed nozzle 30 at the wall thickness portion 13. Since the seal pipe 11 is slightly expanded outward, the seal pipe 11 engages the fuel feed nozzle 30 in a resilient seal manner and thus the inside of the tank body 1 shuts out the outside air completely. When the fuel feed nozzle 30 is further inserted all the way in the fuel supply pipe 2, the closing valve 14 is pushed down by the end of the fuel feed nozzle 30 and rotated about its pivot 23, as shown in FIG. 3. The rotation of the closing valve 14 opens the nozzle passage 9 of the lower nozzle guide 8 and thus communicates the fuel inlet 4 with the inside of the tank body 1. Consequently, the fuel is injected from the fuel feed nozzle 30 to the inside of the tank body 1. According to the above rotation of the closing valve 14, the arm 22 is also rotated, the end of the arm 22 engages the valve rod 18 of the change-over control valve 16 and lifts the valve rod 18 against the force of the spring 17, and thus the passage 20 is communicated with the passage 21 as shown in FIG. 3. Consequently, the fuel vapor generated in the tank body 1 and the fuel vapor generated due to the supplied fuel striking the fuel in the tank body 1 are both absorbed by the activated carbon in the first canister 25. Thus, the fuel vapor is prevented from escaping to the outside air during the fuel supply.

The fuel is filled into the tank body 1 up to the broken line in FIG. 1. The space above the broken line in the tank body 1 is for handling the expanded volume of the fuel due to temperature rises of the tank body 1.

When the fuel in the tank body 1 expands due to the vehicle being out in the sun or to the heat of the engine exhaust, the liquid level of the fuel is raised. However, since there is a space between the second vapor leading opening 26a and the fuel liquid surface, only the fuel vapor in the above space flows into the second canister 28. The liquid fuel does not flow into the second canister 28.

In the meanwhile, if the liquid fuel flows into the first fuel vapor outlet 24 lower than the second fuel vapor outlet 26, since the first fuel vapor passage is closed by the change-over control valve 16, the liquid fuel is prevented from flowing into the first canister 25.

Further, since the fuel supply pipe 2 is communicated with the tank body 1 through the pressure adjusting pipe 29, the upper portion of the fuel supply pipe 2 is kept at the same pressure as the tank body 1, i.e., at almost atmospheric pressure. Thus no negative pressure is generated in the fuel supply pipe 2 and the fuel is prevented from bubbling. Thus, fuel supply is not interfered with.

Figure 4:
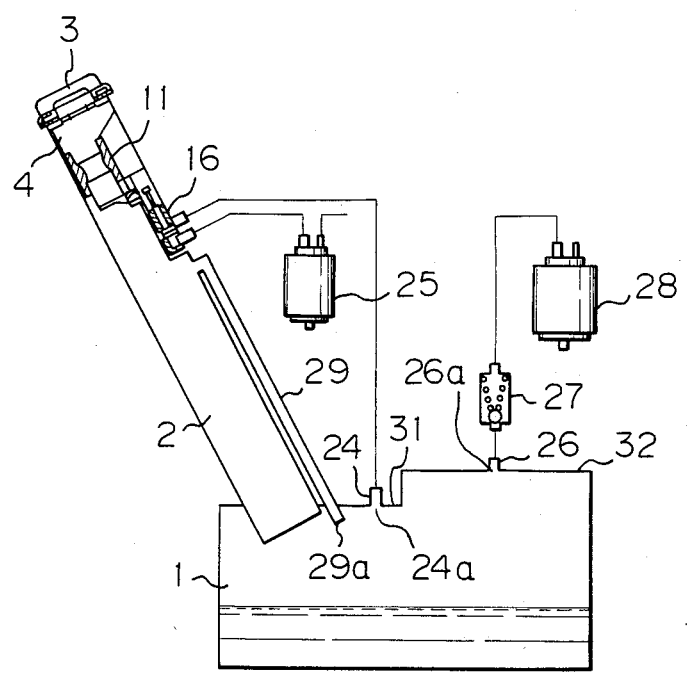
FIG. 4 is a general view of a second embodiment of the present invention.

FIG. 4 shows a second embodiment of the present invention.

In the second embodiment, the tank body 1 is provided with a difference in level at the upper wall thereof. The first full vapor outlet 24 is opened at the upper wall 31 of the lower wall portion and the second fuel vapor outlet 26 is opened at the upper wall 32 of the higher wall portion. Also, the lower end of the pressure adjusting pipe 29 is opened at the upper wall 31 of the lower wall portion.

According to the above arrangement, since the first vapor leading opening 24a is lower than the second vapor leading opening 26a, the liquid fuel is prevented from flowing into the second canister 28.

According to the present invention, since the vapor leading opening connected to the first canister, which absorbs the fuel vapor only during fuel supply, is positioned lower than the vapor leading opening connected to the second canister, which normally absorbs the fuel vapor, and since the check valve is laid between the second canister and the tank body, if the fuel fed into the tank body expands, the liquid fuel is prevented from flowing into the second canister and the decrease of the absorbing capacity of the canister can be eliminated.

The invention in its broader aspect is, therefore, not limited to the specific details, representative apparatus, and illustrative examples shown and described hereinabove. Thus, it is intended that all matter contained in the foregoing description or shown in the accompanying drawings shall be interpreted as illustrative and not in a limiting sense.

We claim:

1. A fuel tank vapor system comprising:
   a fuel tank body having an interior portion and an upper wall;
   a fuel supply pipe mounted on said fuel tank body, said fuel supply pipe having an inlet for receiving a fuel supply nozzle and an outlet communicating with said fuel tank interior portion, said outlet being spaced a selected first distance downwardly from said upper wall;
   a first vapor passage having an outlet in said fuel tank interior spaced from the fuel supply pipe outlet and spaced downwardly a distance substantially equal to said first selected distance from said upper wall;
   a first fuel vapor absorbing canister in vapor communication with said fuel tank interior through said first vapor passage;
   a change-over control valve provided in said first vapor passage between said spaced outlet and said first canister, said control valve having an open and a closed position, said control valve being actuated to said open position such that said spaced outlet is in vapor communication with said first canister in response to the insertion of the fuel supply nozzle in said fuel supply pipe inlet and said valve being actuated to said closed position in response to the withdrawal of the fuel nozzle from said fuel supply inlet;
   a second vapor passage having an outlet in said fuel tank interior, said outlet being spaced from said upper wall by a distance less than said first selected distance;
   a second fuel vapor absorbing canister in vapor communication with said fuel tank interior through said second vapor passage; and
   a pressure biased check valve in said second vapor passage between said outlet and said second canister for releasing vapor into said second canister in response to a predetermined vapor passage in said tank.

2. A fuel tank comprising:
   a tank body
   a fuel supply pipe mounted on said tank body;
   a first canister communicating with a first fuel vapor outlet of said tank body through a first fuel vapor passage;
   a change-over control valve in said first fuel vapor passage operable to open such that said first canister is in vapor communication with said first fuel vapor outlet when fuel is supplied through said fuel supply pipe;
   a second canister communicating with a second fuel vapor outlet of said tank body through a second fuel vapor passage;
   a check valve provided in said second fuel vapor passsage, said check valve being opened t times the pressure with said tank body exceeds a predetermined value;
   a first vapor passage end opening positioned lower in said tank body than a second vapor passage end opening; and
   a pressure adjusting pipe connecting said fuel supply pipe with said tank body, a fuel vapor passage end opening of said pressure adjusting pipe being positioned at least as low as said first fuel vapor passage end opening;

3. A fuel tank comprising:
   a tank body;
   a fuel supply pipe mounted on said tank body, said fuel supply pipe including a nozzle guide therein for insertion of a fuel supply nozzle;
   a first canister communicating with a first fuel vapor outlet of said tank body through a first fuel vapor passage;
   a change-over valve in said first fuel vapor passage operable to open such that said first canister is in vapor communication with said first fuel vapor outlet when fuel is supplied through said fuel supply pipe;
   a second canister communicating with a second fuel vapor outlet of said tank body through a second fuel vapor passage;
   a check valve provided in said second fuel vapor passage, said check valve being opened at times the pressure within said tank body exceeds a predetermined value;
   a first vapor passsage end opening being positioned lower in said tank body than a second vapor passage end opening; and
   a closing valve provided at the end of said nozzle guide being opened only when a fuel supply nozzle is inserted into said nozzle guide, said closing valve being interlocked with said change-over control valve to open said change-over control valve for communicating said tank body with said first canister upon the opening of said closing valve.

4. A fuel tank vapor system according to claim 1 wherein the predetermined vapor pressure of said pressure biased check valve is set to the hydrostatic pressure of the fuel in said tank body against said check valve when the fuel level is to the height of said inlet of said fuel supply pipe.

5. A fuel tank vapor system according to claim 1, wherein said fuel supply pipe includes a pressure adjusting pipe connecting said tank body with an upper portion of said fuel supply pipe, said pressure adjusting pipe having an outlet in said fuel tank interior portion, said outlet being positioned a distance from said upper wall a distance at least as great as said first selected distance.

6. A fuel tank vapor system according to claim 1, wherein said fuel tank outlet of said second vapor passsage is substantially flush with said upper wall of said fuel tank body.

7. A fuel tank vapor system according to claim 1, wherein said fuel supply pipe includes a nozzle guide therein for insertion of said fuel supply nozzle, and
   a closing valve provided at the end of said nozzle guide, said closing valve being operable to open in response to the insertion of the fuel nozzle and being operable to close in response to the withdrawal of the fuel nozzle from said nozzle guide, said closing valve being interlocked with said change-over control valve to open said change-over control valve for communicating said fuel tank body with said first canister upon the opening of said closing valve.

* * * * *

UNITED STATES PATENT AND TRADEMARK OFFICE
CERTIFICATE OF CORRECTION

PATENT NO. : 4,790,283
DATED : December 13, 1988
INVENTOR(S) : KOJI URANISHI et al.

It is certified that error appears in the above-identified patent and that said Letters Patent is hereby corrected as shown below:

Col. 5, line 68, "t" should be --at--;

Col. 6, line 1, "with" should be --within--.

Signed and Sealed this

Fourth Day of July, 1989

Attest:

DONALD J. QUIGG

*Attesting Officer*    *Commissioner of Patents and Trademarks*